United States Patent
Boissiere et al.

(10) Patent No.: US 9,821,504 B2
(45) Date of Patent: *Nov. 21, 2017

(54) INJECTION STRETCH BLOW MOULDED ARTICLES

(75) Inventors: Jean-Marie Boissiere, Brussels (BE); Aurelien Vantomme, Bios-d'Haine (BE); Pierre Belloir, Braine-l'Alleud (BE); Alain Van Sinoy, Chastre (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 1136 days.

This patent is subject to a terminal disclaimer.

(21) Appl. No.: 13/979,101

(22) PCT Filed: Jan. 10, 2012

(86) PCT No.: PCT/EP2012/050311
§ 371 (c)(1),
(2), (4) Date: Sep. 19, 2013

(87) PCT Pub. No.: WO2012/095423
PCT Pub. Date: Jul. 19, 2012

(65) Prior Publication Data
US 2014/0004285 A1 Jan. 2, 2014

(30) Foreign Application Priority Data

Jan. 11, 2011 (EP) .................... 11150670

(51) Int. Cl.
*C08L 23/00* (2006.01)
*B29C 49/00* (2006.01)
*B29K 23/00* (2006.01)
*B29C 49/06* (2006.01)
*B29C 49/08* (2006.01)

(52) U.S. Cl.
CPC .......... *B29C 49/0005* (2013.01); *B29C 49/06* (2013.01); *B29C 49/08* (2013.01); *B29K 2023/065* (2013.01); *B29K 2023/0658* (2013.01); *Y10T 428/1352* (2015.01)

(58) Field of Classification Search
CPC ..... B29C 49/0005; B29C 49/06; B29C 49/08; Y10T 428/1352; B29K 2023/065; B29K 2023/0658; C08L 2205/025
See application file for complete search history.

(56) References Cited

U.S. PATENT DOCUMENTS

| 2008/0188632 A1 | 8/2008 | Razavi |
| 2009/0036610 A1 | 2/2009 | Jaker |
| 2010/0133714 A1 | 6/2010 | Jaker |

FOREIGN PATENT DOCUMENTS

| EP | 0 151 741 A2 | 8/1985 |
| EP | 1 287 969 A1 | 3/2003 |
| JP | 9-194534 A | 7/1997 |
| JP | 2000-86722 A | 3/2000 |
| JP | 2000-86833 A | 3/2000 |
| KR | 2008-0026604 | 3/2008 |
| WO | 95/11791 A2 | 5/1995 |
| WO | 2005/005143 A1 | 1/2005 |

OTHER PUBLICATIONS

Korean Office Action issued in Korean Application No. 2013-7020809 dated Oct. 6, 2014 (12 pages).
International Search Report issued in International Application No. PCT/EP2012/050311 dated Mar. 26, 2012 (2 pages).

*Primary Examiner* — Nathan M Nutter
(74) *Attorney, Agent, or Firm* — Albert Shung

(57) ABSTRACT

This invention covers injection stretch blow molded articles prepared from polyethylene resin having a bimodal molecular weight distribution (MWD), defined by the ratio of the weight average molecular weight (Mw) to the number average molecular weight (Mn), of from 2 to 20, comprising two polyethylene fractions A and B, fraction A being substantially free of comonomer and having a lower weight average molecular weight and a higher density than fraction B, each fraction prepared in different reactors of two reactors connected in series in the presence of a metallocene-containing catalyst system.

15 Claims, No Drawings

INJECTION STRETCH BLOW MOULDED ARTICLES

CROSS-REFERENCE TO RELATED APPLICATIONS

This application claims the benefit of PCT/EP2012/050311, filed on Jan. 10, 2012, which claims priority from EP 11150670.5, filed on Jan. 11, 2011.

FIELD OF THE INVENTION

The present invention relates to a polyethylene resin with a multimodal, preferably bimodal, molecular weight distribution for the preparation of polyethylene preforms for one- or two-stage injection-stretch-blow-moulding (ISBM) processes and to the ISBM articles produced therefrom.

BACKGROUND OF THE INVENTION

Injection-stretch blow molding (ISBM) is a process widely used for the production of containers, such as bottles, using thermoplastic polymers. The process includes the steps of preparing a pre-form by injection molding and then expanding the pre-form to the desired final shape. In general, one distinguishes one-stage and two-stage processes. In the one-stage process the steps of producing the pre-form and expanding the pre-form to the desired final shape are performed in the same machine. In the two-stage process these two steps are performed in different machines, in some cases even in different geographical locations; the pre-form is allowed to cool to ambient temperature and is then transported to a second machine where it is reheated and expanded to the desired final shape. Due to reasons of production speed and flexibility the two-stage process is preferred for larger production volumes.

Recent progress in development has made polypropylene a viable alternative to polyethylene terephthalate (PET) for injection-stretch blow molding (ISBM). Due to their good optical properties propylene-ethylene random copolymers are the preferred polypropylene grades.

For the injection molding of polypropylene it is well known to improve the impact performance, while also having good optical properties, by the addition of a polyethylene, which has been produced using a metallocene catalyst.

For example, EP-A-151741 to Mitsui discloses single-stage manufacturing of articles by ISBM. These articles are prepared from propylene-ethylene random copolymers having a melt flow index of from 4 to 50 g/10 min and containing a nucleating agent. WO95/11791 to Bekum is directed to a two-stage process for preparing articles by ISBM. The preferred resin is an ethylene-propylene copolymer containing more than 50 wt % of propylene and having a melt index of from 10 to 20 g/10 min.

WO 2005/005143 to Total Petrochemicals discloses blow-molded containers made from a blend of polypropylene and a metallocene polyethylene to improve the impact strength.

The polypropylenes presently used in injection-stretch blow molding applications allow for the production of containers with good optical properties at industrially viable production rates. However, as compared to other polymers used in injection-stretch blow molding, polypropylene suffers from a lack of the combination of high rigidity and high ESCR, as well as high impact strength, particularly at lower temperatures.

Thus, there is an interest for improving the impact performance, rigidity and ESCR of injection-stretch blow molded containers. A balance has to be found between the high fluidity required for the first step to form the preform and the lower fluidity required for the second step when blowing the preform.

JP2000086722 to Asahi discloses the use of high-density polyethylene, preferably prepared with a metallocene catalyst, suitable for injection stretch blow molding.

JP2000086833 to Asahi discloses the use of resin compositions suitable for injection stretch blow molding at a high stretch ratio, comprising a polyethylene prepared with a metallocene catalyst and a polyethylene prepared with a chromium catalyst.

JP9194534 to Mitsui discloses the use of a polyethylene-based resin for injection stretch blow molding having a density of 0.940 to 0.968 g/cm$^3$ and a melt flow index of 0.3 to 10 g/10 min (ASTM D1238 at 190° C. and 2.16 kg).

It is an aim of the invention to provide a polyethylene resin for injection stretch blow moulding with a broad processing window.

It is also an aim of the invention to provide a polyethylene resin for injection stretch blow moulding with good process stability.

It is an aim of the invention to provide a polyethylene resin for injection stretch blow moulding with a high environmental stress crack resistance (ESCR measured with 100% Igepal CO-630). The environmental stress crack resistance is advantageously of at least 100 h, preferably at least 400 h.

In addition is an aim of the invention to provide a polyethylene resin for injection stretch blow moulding with a high impact resistance.

Furthermore, it is an aim of the invention to provide a polyethylene resin for injection stretch blow moulding with high rigidity.

In addition, it is also an aim of the invention to provide a polyethylene resin for injection stretch blow moulding to prepare containers with a high top load. The top load is the ability of a standing bottle to withstand the weight of other bottles on pallets.

It is further an aim of the invention to provide a polyethylene resin for injection stretch blow moulding to prepare containers with good thickness repartition.

It is additionally an aim of the invention to provide a polyethylene resin for injection stretch blow moulding to prepare containers with good surface aspects.

It is furthermore an aim of the invention to provide a polyethylene resin for injection stretch blow moulding to prepare containers with good finishing for molded drawings.

Finally, it is also an aim of the invention to provide a polyethylene resin suitable for injection stretch blow moulded containers for consumer packaging, in particular for cosmetics and detergents.

At least one of these aims is fulfilled by the resin of the present invention.

SUMMARY OF THE INVENTION

Accordingly, the present invention covers injection stretch blow moulded articles, in particular containers such as bottles, prepared from a high density polyethylene (HDPE) resin comprising two polyethylene fractions A and B, each prepared in different reactors of two reactors connected in series in the presence of a metallocene-containing catalyst system, wherein the metallocene is a bridged bis-indenyl metallocene and/or bridged bis-tetrahydrogenated indenyl metallocene, polyethylene fraction A being substantially free of comonomer and having a low molecular weight and a high density relative to polyethylene fraction B, the HDPE resin having a density of from 0.950 to 0.965 g/cm$^3$, measured following the method of standard test ASTM 1505 at a temperature of 23° C., a melt index MI2 of from 0.5 to 5 g/10 min, measured following the method of standard test ASTM D 1238 at a temperature of 190° C. and under a load of 2.16 kg, and bimodal molecular weight, an distribution Mw/Mn of from 2 to 20.

The metallocene is selected from formulas (I) and (II) below.

Preferably, the HDPE resin consists essentially of polyethylene fractions A and B.

Preferably, the metallocene comprises a bridged unsubstituted bis(tetrahydroindenyl), such as ethylene-bis(tetrahydroindenyl) zirconium dichloride and ethylene-bis(tetrahydroindenyl)zirconium difluoride.

Preferably, the two reactors in series are two loop reactors, more preferably two slurry loop reactors or two liquid full loop reactors i.e. a liquid full double loop reactor.

Preferably, polyethylene fraction A is produced in the first reactor and polyethylene fraction B is produced in the second reactor. Preferably, polyethylene fraction A is not degassed.

In an alternative embodiment, said polyethylene fraction B is produced in the first reactor and said polyethylene fraction A is produced in the second reactor, whereby the polyethylene fraction B is degassed, such that fraction A produced in the second reactor is substantially free of comonomer.

The invention also covers the process of producing the HDPE resin for injection stretch blow moulding according to the invention. In this process, ethylene is polymerized in the presence of a metallocene-containing catalyst system, wherein the metallocene is a bridged bisindenyl and/or bridged bis-tetrahydrogenated indenyl metallocene, to produce polyethylene fractions A and B prepared in different reactors of two reactors connected in series, polyethylene fraction A being substantially free of comonomer and having a low molecular weight and high density relative to polyethylene fraction B, and the resulting HDPE resin has a molecular weight distribution Mw/Mn of 2 to 20. The same conditions and properties for the resin apply to the process for producing the HDPE resin.

The invention also covers the preforms for injection stretch blow moulded articles according to the invention, in particular containers such as bottles, prepared with the HDPE resin, as well as the process for injection stretch blow moulding the resin and preform into articles.

Finally, the invention also covers the use of the HDPE resin according to the invention in injection stretch blow moulding to produce articles, in particular containers such as bottles, to reduce the cycle time during injection stretch blow moulding and/or increase the mould's lifespan, and/or decrease maintenance frequency of the mould in comparison with HDPE resin having smaller MWD and/or made with Ziegler-Natta or other metallocene-containing catalyst systems.

DETAILED DESCRIPTION OF THE INVENTION

The term "bimodal" refers to the presence, within the same polyethylene resin, of two populations of polyethylene macromolecules i.e. polyethylene fractions A and B, each having different weight average molecular weights. The HDPE resin in this invention has a bimodal molecular weight distribution. Thus the HDPE resin is a blend at the polyethylene particle level wherein the different fractions of polyethylene can be obtained by operating two reactors under different polymerisation conditions and transferring the first fraction to the second reactor.

The two reactors can be operated under the comonomer/hydrogen split mode of "inverse" (also described herein as "reverse") configuration, wherein a first low molecular weight, high density polyethylene fraction A is produced in the first reactor and a second high molecular weight, low density polyethylene fraction B is produced in the second reactor. In this case, the first polyethylene fraction does not need to be degassed before being transferred to the second reactor. Polyethylene fraction A will be substantially free of comonomer. This is as opposed to the "direct" configuration, wherein the first high molecular weight, low density polyethylene fraction B is produced in the first reactor and the second low molecular weight, high density polyethylene fraction A is produced in the second reactor, in which case the first polyethylene fraction B does need to be degassed in order to substantially remove all unpolymerised comonomer and thus for said second fraction A to be substantially free of comonomer.

The HDPE resin according to the invention is prepared in the presence of a metallocene-containing catalyst system. The metallocene comprises a bridged bis-indenyl or bridged bis-tetrahydrogenated indenyl catalyst component. The metallocene is selected from one of the following formula (I) or (II):

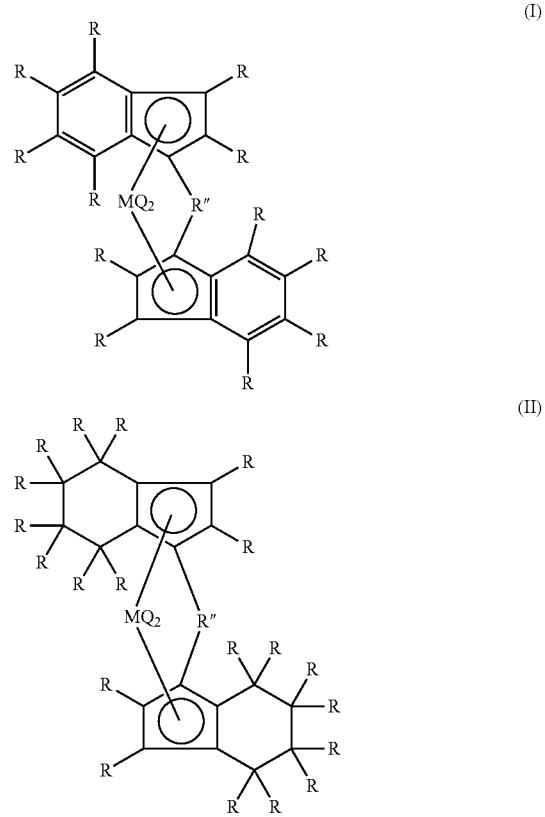

wherein each R is the same or different and is selected independently from hydrogen or XR'v in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls to impart stereorigidity that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal Group 4 of the Periodic Table or vanadium.

Each indenyl or tetrahydrogenated indenyl component may be substituted with R in the same way or differently from one another at one or more positions on the cyclopentadienyl ring or on the cyclohexenyl ring. Each substituent is independently chosen.

If the cyclopentadienyl ring is substituted, its substituent groups must not be so bulky as to affect coordination of the olefin monomer to the metal M. Any substituents XR'v on the cyclopentadienyl ring are preferably methyl. More preferably, at least one and most preferably both cyclopentadienyl rings are unsubstituted.

In a particularly preferred embodiment, the metallocene comprises a bridged unsubstituted bis-indenyl and/or bis-tetrahydrogenated indenyl i.e. all R are hydrogens. More preferably, the metallocene comprises a bridged unsubstituted bis-tetrahydrogenated indenyl. Most preferably the metallocene is ethylene-bis(tetrahydroindenyl)zirconium dichloride or ethylene-bis(tetrahydroindenyl) zirconium difluoride.

The active catalyst system used for polymerising ethylene comprises the above-described catalyst component and a suitable activating agent having an ionising action.

Suitable activating agents are well known in the art: they include aluminium alkyls aluminoxane or boron-based compounds. Preferably, the activating agent is selected from aluminium alkyls, more preferably from one or more of TIBAL, TEAL or TNOAL. Most preferably, the activating agent is TIBAL.

Optionally, the catalyst component can be supported on a support. Preferably the support is silica, a modified silica alumina or a modified silica, for example MAO-modified silica or a fluorinated silica support.

The polymerisation of the metallocene-produced high density polyethylene can be carried out in gas, solution or slurry phase. Slurry polymerisation is preferably used to prepare the high density polyethylene. The polymerisation temperature ranges from 20 to 125° C., preferably from 55 to 105° C., more preferably from 60 to 100° C. and most preferably from 65 to 98° C. and the pressure ranges from 0.1 to 10 MPa, preferably from 1 to 6 MPa, more preferably from 2 to 4.5 MPa, for a time ranging from 10 minutes to 6 hours, preferably from 1 to 3 hours, most preferably from 1 to 2.5 hours.

A double loop reactor is preferably used for conducting the polymerisation. More preferably, the two reactors in series are preferably a slurry or liquid full double loop reactor wherein each loop is operated under different conditions in order to produce the HDPE resin. The double loop reactor can be operated in the inverse configuration wherein polyethylene fraction A is prepared in the first loop reactor and polyethylene fraction B is prepared in the second loop reactor. In this configuration polyethylene fraction A does not need to be degassed before being transferred to the second reactor, as it is already substantially free of comonomer. The double loop reactor can also be operated in the direct configuration wherein the polyethylene fraction B is prepared in the first loop reactor and the polyethylene fraction A is prepared in the second loop reactor. In this configuration the first polyethylene fraction B needs to be degassed before being transferred to the second reactor, such that fraction A produced in the second loop reactors is substantially free of comonomer.

The high molecular weight, low density fraction (fraction B) has a density of at least 0.908 g/cm$^3$, preferably of at least 0.922 g/cm$^3$ and of at most 0.938 g/cm$^3$, more preferably of at most 0.945 g/cm$^3$. Most preferably it is of about 0.936 g/cm$^3$. It has a high load melt index HLMI of at least 4 g/10 min, more preferably of at least 10 g/10 min and most preferably of at least 20 g/10 min and of at most 45 g/10 min, more preferably of at most 30 g/10 min. Most preferably, it is of 24 to 28 g/10 min.

The low molecular weight, high density fraction (fraction A) has a density of at least 0.953 g/cm$^3$, more preferably of at least 0.957 g/cm$^3$, and of at most 0.978 g/cm$^3$, more preferably of at most 0.962 g/cm$^3$. Most preferably it is of about 0.957 to 0.976 g/cm$^3$.

The HLMI and density of the fraction in the second reactor were determined using the following formula:

$$\text{Log HLMI}_{final} = \text{wt \%}_{1st} \times \text{Log HLMI}_{1st} + \text{wt \%}_{2nd} \times \text{Log HLMI}_{2nd}$$

$$\text{density}_{final} = \text{wt \%}_{1st} \times \text{density}_{1st} + \text{wt \%}_{2nd} \times \text{density}_{2nd}$$

wherein
"final" means "of the polyethylene resin"
"1st" means "of the polyethylene fraction produced in the first reactor"
"2nd" means "of the polyethylene fraction produced in the second reactor, downstream of the first reactor"

The HDPE resin according to the invention has a density of from 0.950 to 0.965 g/cm$^3$, preferably 0.952 to 0.962 g/cm$^3$, more preferably 0.954 to 0.962 g/cm$^3$ and most preferably 0.957 to 0.960 g/cm$^3$. The HDPE resin has a melt index MI2 of from 0.5 to 5 g/10 min, preferably 0.8 to 3 g/10 min.

Density is measured according to ASTM 1505 at a temperature of 23° C.

The melt index MI2 and high load melt index HLMI are measured by the method of standard test ASTM D 1238 respectively under a load of 2.16 kg and 21.6 kg and at a temperature of 190° C.

The molecular weight distribution is defined by the ratio Mw/Mn of the weight average molecular weight Mw to the number average molecular weight Mn as determined by gel permeation chromatography (GPC).

Preferably the polyethylene resin comprises 36 to 50 wt % of HMW fraction, preferably from 38 to 46 wt %, more preferably from 40 to 43 wt % and from 50 to 64 wt % of LMW fraction, preferably from 54 to 62 wt % and most preferably from 57 to 60 wt %. The most preferred polyethylene resin according to the present invention has a density of about 0.959 g/cm$^3$ and a melt index MI2 of about 0.8-1.6 g/10 min and a molecular weight distribution of about 2 to 20.

The HDPE resin has a molecular weight distribution (MWD), which is the ratio of the weight average molecular weight Mw to the number average molecular weight Mn (Mw/Mn), of 2 to 20, preferably 3 to 10, more preferably 4 to 8.

The HDPE resin according to the invention has particular rheological properties. The HDPE resin of the invention has a rheological horizontal activation energy of more than 45 kJ/mol at a frequency of 1 s$^{-1}$ and a rheological horizontal activation energy of less than 45 kJ/mol at a frequency of 100 s$^{-1}$. More preferably, the HDPE resin has a rheological horizontal activation energy of more than 50 kJ/mol at a frequency of 1 s$^{-1}$ and a rheological horizontal activation energy of less than 40 kJ/mol at a frequency of 100 s$^{-1}$. This can be seen in Figure 1. Rheological horizontal activation energy is measured on a Rheometrics® ARES rheometer at 170, 190 and 210° C. by inducing shear deformation within the linear viscoelastic regime (at 10% deformation) and recording complex viscosity at different shear rates.

The HDPE resin of the present invention may contain additives, in particular additives suitable for injection stretch blow moulding, such as, by way of example, processing aids, mould-release agents, anti-slip agents, primary and secondary antioxidants, light stabilizers, anti-UV agents, acid scavengers, flame retardants, fillers, nanocomposites, lubricants, antistatic additives, nucleating/clarifying agents, antibacterial agents, plastizisers, colorants/pigments/dyes and mixtures thereof. Illustrative pigments or colorants include titanium dioxide, carbon black, cobalt aluminum oxides such as cobalt blue, and chromium oxides such as chromium oxide green. Pigments such as ultramarine blue, phthalocyanine blue and iron oxide red are also suitable. Specific examples of additives include lubricants and mould-release agents such as calcium stearate, zinc stearate, SHT, antioxidants such as Irgafos 168™, Irganox 1010™, and Irganox 1076™, anti-slip agents such as erucamide, light stabilizers such as tinuvin 622™ and tinuvin 326™, and nucleating agents such as Milliken HPN20E™.

An overview of the additives that can be used in the injection stretch blow moulded articles of the present invention may be found in Plastics Additives Handbook, ed. H. Zweifel, 5th edition, 2001, Hanser Publishers.

Injection-Stretch Blow Molding

The polyethylene resin according to the invention is particularly suitable for injection stretch blow molding applications. In particular, it provides a broad processing window, good process stability to prepare containers with good thickness repartition, good surface aspects, good finishing, high ESCR and a high top load.

The injection-stretch blow molding process of the present invention can either be a one-stage or a two-stage process. In a one-stage process injection molding of the preform and blowing of the preform to the final desired shape are performed on the same machine, whereas in a two-stage process injection-molding of the preform and blowing of the preform are conducted in different machines, which can be separated by a long distance. Thus, the two-stage process additionally requires the cooling of the preform to ambient temperature and a subsequent reheating before the blowing step.

It has now been surprisingly found that under stretching and blowing conditions similar to those used for polyethylene terephthalate, containers with high rigidity, high ESCR and high impact resistance can be obtained.

The polyethylene resins according to the invention, having such a specific composition, molecular weight and density, can lead to a marked improvement of the processing properties when the resin is used in injection-stretched-blow-moulding, while conserving or improving mechanical behaviour as compared to the same articles prepared with other resins.

The present invention also comprises the method for preparing preforms, the preforms so obtained, the use of said preforms for preparing containers, and the containers prepared from said preforms.

Polyethylene resin is generally not used in injection-stretch-blow-moulding applications and the injection-stretch-blow-moulding conditions are thus adapted accordingly.

The preform, which has an open and a closed end, is prepared by injection molding. For the present invention the polyethylene resin according to the invention is fed to an extruder, plasticized and injected under pressure into an injection mold through an opening, generally referred to as "gate". The polyethylene resin is injected into the injection mold at an injection temperature of at least 220° C., preferably of at least 230° C. The injection temperature is at most 300° C., preferably at most 290° C. and most preferably at most 280° C. The choice of injection temperature depends upon the melt flow index of the polyethylene resin. It is clear to the skilled person that a lower melt flow index requires a higher injection temperature and vice versa. The injection mold is filled at such a rate as to give a ratio of mold filing rate (in cm$^3$/s) over gate size (in mm) of 15 or less, preferably of 10 or less. The preform is cooled inside the injection mold and removed from it. The ratio of mold filling rate over gate size varies depending upon the viscosity of the molten polyethylene resin, i.e. a more viscous molten polyethylene resin requires a lower value for the ratio than a more fluid molten polyethylene resin, so that a preform with good processing properties in the subsequent stretch-blowing steps will be obtained.

The two-step process comprises the steps of:
providing a preform by injection moulding on a mould, preferably on a multi-cavity mould;
cooling the preform to room temperature;
transporting the preform to the blow moulding machine;
reheating the preform in the blow moulding machine in a reflective radiant heat oven
optionally, passing the heated preform through an equilibration zone to allow the heat to disperse evenly through the preform wall;
optionally, submitting the preform to a pre-blow step;
stretching the preform axially by a centre rod;
orienting the stretched preform radially by high pressure air.

The one-step process comprises the steps of:
providing a pre-form by injection moulding on a mould, preferably on a multi-cavity mould;
optionally slightly re-heating the pre-form;
optionally, passing the heated pre-form through an equilibration zone to allow the heat to disperse evenly through the pre-form wall;
optionally, submitting the preform to a pre-blow step;
stretching the pre-form axially by a centre rod;
orienting the stretched pre-form radially by high pressure air.

In a one-stage process the preform is cooled to a temperature in the range from 90° C. to 140° C. and is stretch-blown into a container. All of these steps are performed on a single machine.

In a two-stage process the preform is allowed to cool to ambient temperature and transported to a different machine. The preforms are uniformly reheated to a temperature below the polyethylene's melting point. The reheating can be followed by an equilibration step. Subsequently, the preform is transferred to the stretch-blowing zone and secured within the blowing mold, which has the same shape as the final container, in such a way that the closed end of the preform points to the inside of the blowing mold. The preform is stretched axially with a center rod, generally referred to as "stretch rod" to bring the wall of the perform against the inside wall of the blowing mold. The stretch rod speed can go up to 2000 mm/s. Preferably it is in the range from 100 mm/s to 2000 mm/s, and more preferably in the range from 500 mm/s to 1500 mm/s. Pressurized gas is used to radially blow the preform into the blowing mold shape. The blowing is done using gas with a pressure in the range from 5 bars to 40 bars, and preferably from 10 bars to 30 bars.

The blowing of the preform can also be performed in two steps, by first pre-blowing the preform with a lower gas pressure, and then blowing the preform to its final shape with a higher gas pressure. The gas pressure in the pre-blowing step is in the range from 2 bars to 10 bars, preferably in the range from 4 bars to 6 bars. The preform is blown into its final shape using gas with a pressure in the range from 5 bars to 40 bars, more preferably from 10 bars to 30 bars, and most preferably from 15 bars to 25 bars.

Following the stretching and blowing, the container is rapidly cooled and removed from the blowing mold.

The containers obtained by the injection-stretch blow molding process of the present invention are characterized by good impact properties in combination with high rigidity and high ESCR.

The articles prepared according to the present invention are hollow containers and bottles that can be used in various food and non-food applications, in particular for consumer packaging. The food applications comprise in particular the storage of juices, dry products and dairy products. The non-food applications comprise in particular the storage of cosmetic, detergents and pharmaceutical products.

EXAMPLES

1. Resin Properties

The following bimodal metallocene resin (resin 1) was used:

TABLE 1

| resin properties | |
|---|---|
| | Resin 1 |
| Density (g/cm$^3$) | 0.951 |
| HLMI (g/10 min) | 88.1 |

2. Injection Process

The preforms (about 24 g) were injected on 80 Ton Netstal Arburg mono cavity machine. The conditions used for injection are given in the table 2.

TABLE 2

| Conditions for injection | |
|---|---|
| Resin | Resin 1 |
| Barrel temperatures(° C.) | 250 |
| Hot runner temperatures(° C.) | 250 |
| Injection speed (mm/s) | 5 |
| Cycle time (s) | 48.3 |

3. Blowing Process

The bottles (500 ml, about 24 g) have been blown on an ADS G62 PPO1 machine (two cavities). All tests were realized with industrial equipments and industrial conditions with 1500 b/h/cavity as throughput. The bottles obtained present the following properties (cf table 3).

TABLE 3

| Bottle properties | |
|---|---|
| | Resin 1 |
| Maximum Load, N | 134 |
| Gloss, 45 (%) | 32 |
| Haze (%) | 39.5 |

Standard process conditions allow to obtain a good compromise between top load and optics properties.

The invention claimed is:

1. An injection stretch blow moulded article prepared from high density polyethylene (HDPE) resin comprising:
    two polyethylene fractions comprising fraction A and fraction B, fraction A being substantially free of comonomer and having a lower weight average molecular weight and a higher density than fraction B, each fraction prepared in different reactors of two reactors connected in series in the presence of a metallocene-containing catalyst system;
    wherein the metallocene is selected from at least one of the following formula (I) or (II):

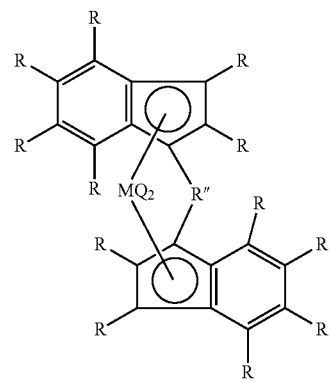

(I)

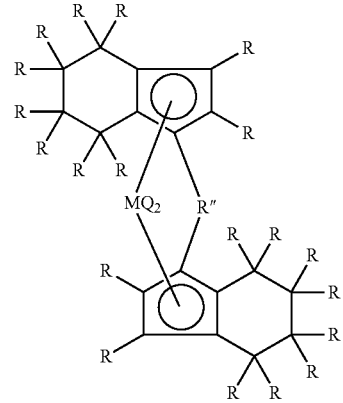

(II)

wherein each R is the same or different and is selected from hydrogen or XR'$_v$ in which X is chosen from carbon, silicon, germanium, oxygen or nitrogen, and each R' is the same or different and is chosen from hydrogen or a hydrocarbyl of from 1 to 20 carbon atoms and v+1 is the valence of X;

wherein R" is a structural bridge between the two indenyl or tetrahydrogenated indenyls to impart stereorigidity that comprises a $C_1$-$C_4$ alkylene radical, a dialkyl germanium, silicon or siloxane, or an alkyl phosphine or amine radical;

wherein Q is a hydrocarbyl radical having from 1 to 20 carbon atoms or a halogen;

and wherein M is a transition metal Group 4 of the Periodic Table or vanadium;

wherein the HDPE resin has a bimodal molecular weight distribution (MWD), defined by the ratio of the weight average molecular weight (Mw) to the number average molecular weight (Mn), of from 2 to 20, a density, measured following the method of standard test ASTM 1505 at a temperature of 23° C., of from 0.950 to 0.965 g/cm³, and a melt index MI2, measured following the method of standard test ASTM D 1238 at a temperature of 190° C. and under a load of 2.16 kg, of from 0.5 to 5 g/10 min, and wherein the fraction B has a melt index MI2 of from 0.908 g/cm³ to 0.938 g/cm³ and a high load melt index HLMI, measured following the method of standard test ASTM D 1238 at a temperature of 190° C. and under a load of 21.6 kg, of from 4 to 45 g/10 min.

2. The injection stretch blow moulded article according to claim 1 wherein the metallocene comprises a bridged unsubstituted bis(tetrahydroindenyl).

3. The injection stretch blow moulded article according to claim 2 wherein the metallocene is selected from ethylene-bis(tetrahydroindenyl) zirconium dichloride and ethylene-bis(tetrahydroindenyl)zirconium difluoride.

4. The injection stretch blow moulded article according to claim 1 wherein the two reactors connected in series are a double loop reactor.

5. The injection stretch blow moulded article according to claim 1 wherein the HDPE resin has a melt index MI2 of 0.8 to 3 g/10 min, and a density of from 0.952 to 0.962 g/cm³.

6. The injection stretch blow moulded article according to claim 1 wherein the fraction A comprises a polyethylene obtained from a first reactor of the two reactors and the fraction B comprises a polyethylene obtained from a second reactor of the two reactors.

7. The injection stretch blow moulded article according to claim 1 wherein the fraction A has a melt index MI2, measured following the method of standard test ASTM D 1238 at a temperature of 190° C. and under a load of 2.16 kg, of from 10 to 1000 g/10 min, and a density, measured following the method of standard test ASTM 1505 at a temperature of 23° C., of from 0.953 to 0.980 g/cm³.

8. The injection stretch blow moulded article according to claim 1 wherein the HDPE resin exhibits a rheological horizontal activation energy at a frequency of 1 $s^{-1}$ is more than 45 kJ/mol and at a frequency of 100 $s^{-1}$ is less than 45 kJ/mol.

9. The injection stretch blow moulded article according to claim 8 wherein the rheological horizontal activation energy at a frequency of 1 $s^{-1}$ is more than 50 kJ/mol and at a frequency of 100 $s^{-1}$ is less than 40 kJ/mol.

10. The injection stretch blow moulded article according to claim 1 wherein the article is a bottle or a container.

11. The injection stretch blow moulded article according to claim 10, wherein the container is a packaging for dairy products, food products, cosmetics, detergents or pharmaceutical products.

12. The injection stretch blow moulded article of claim 1, wherein R is selected from hydrogen, methyl, ethyl, n-propyl, isopropyl, n-butyl and tert-butyl.

13. The injection stretch blow moulded article of claim 1, wherein Q is chlorine or fluorine.

14. The injection stretch blow moulded article of claim 4, wherein the double loop reactor is a liquid full double loop reactor.

15. The injection stretch blow moulded article of 5, wherein the HDPE resin has a density of from 0.954 to 0.962 g/cm³

* * * * *